(12) United States Patent
Carter et al.

(10) Patent No.: US 7,603,104 B2
(45) Date of Patent: Oct. 13, 2009

(54) APPARATUS AND METHOD OF MAKING A SECURE CALL

(75) Inventors: Stephen Carter, San Diego, CA (US); Gene Pitkin, Oceanside, CA (US); Henry Tong, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 10/015,996

(22) Filed: Dec. 10, 2001

(65) Prior Publication Data

US 2002/0115425 A1 Aug. 22, 2002

Related U.S. Application Data

(60) Provisional application No. 60/254,462, filed on Dec. 8, 2000.

(51) Int. Cl.
*H04M 1/66* (2006.01)
*H04M 1/68* (2006.01)
*H04M 3/16* (2006.01)

(52) U.S. Cl. ............... 455/411; 455/410; 455/414.1; 455/558; 379/145; 379/189

(58) Field of Classification Search ........... 455/410, 455/411, 550.1, 565, 452.1, 414.1, 558; 379/145, 379/189
See application file for complete search history.

(56) References Cited

U.S. PATENT DOCUMENTS

| | | | | |
|---|---|---|---|---|
| 4,555,805 A | * | 11/1985 | Talbot | 380/33 |
| 5,077,791 A | * | 12/1991 | Salihi | 380/270 |
| 5,493,693 A | * | 2/1996 | Tanaka et al. | 455/403 |
| 5,612,682 A | * | 3/1997 | DeLuca et al. | 340/5.74 |
| 5,805,084 A | * | 9/1998 | Mannisto | 341/22 |
| 5,845,205 A | * | 12/1998 | Alanara et al. | 455/564 |
| 6,151,677 A | * | 11/2000 | Walter et al. | 713/183 |
| 6,442,406 B1 | * | 8/2002 | Harris et al. | 455/565 |
| 6,662,020 B1 | * | 12/2003 | Aaro et al. | 455/552.1 |
| 6,704,567 B1 | * | 3/2004 | Chapman et al. | 455/422.1 |
| 2002/0055366 A1 | * | 5/2002 | Maggenti et al. | 455/517 |

* cited by examiner

*Primary Examiner*—Stephen M D'Agosta
(74) *Attorney, Agent, or Firm*—Won Tae C Kim

(57) ABSTRACT

A system of operating a wireless handset capable of making clear and secure calls is claimed. A secure call may be made by pressing a key for a predetermined amount of time. The handset enters a secure mode if the key is held for a time period greater than the predetermined amount of time. The handset enters a clear mode if the key is held for a time period less than the predetermined amount of time.

28 Claims, 5 Drawing Sheets

APPARATUS AND METHOD OF MAKING A SECURE CALL

CROSS-REFERENCE TO RELATED APPLICATION

This application claims the benefit of U.S. Provisional Patent Application Ser. No. 60/254,462, filed Dec. 8, 2000, which application is incorporated herein by reference in its entirety.

BACKGROUND

1. Field of the Invention

The invention generally relates to wireless handsets. More particularly, the invention relates to operability of handsets in non-secure and secure modes.

2. Background of the Invention

Security is a well-known problem in telecommunications, and in particular, wireless communications. Accordingly, handsets capable of secure or encrypted communications have been developed. However, a user of a secure handset may not always need to communicate in a secure mode, or may need to communicate with a user who does not have secure capabilities. Accordingly, what is needed is the ability for a handset to operate and smoothly transition between secure and non-secure modes of operations.

SUMMARY OF THE INVENTION

Embodiments of the invention have the ability to operate in secure and non-secure modes, and the ability to smoothly transition between secure and non-secure states. In a system of operating a wireless handset capable of making clear and secure calls, a method of making a secure call comprises pressing a key for a predetermined amount of time; entering a secure mode if the key is held for a time period greater than the predetermined amount of time; and entering a clear mode if the key is held for a time period less than the predetermined amount of time.

A wireless apparatus configurable to make clear and secure calls. The apparatus comprises a user-interface key capable of being depressed; and a time-out circuit configured to measure the amount of time the user interface key is depressed, wherein the apparatus is configured to operate in a secure mode if the user-interface key is depressed for greater than a predetermined amount of time, and wherein the apparatus is configured to operate in a clear mode if the user-interface key is depressed for less than a predetermined amount of time.

The features, objects, and advantages of the present invention will become more apparent from the detailed description set forth below when taken in conjunction with the drawings and wherein:

DETAILED DESCRIPTION OF THE PREFERRED EMBODIMENTS

Figure 1:
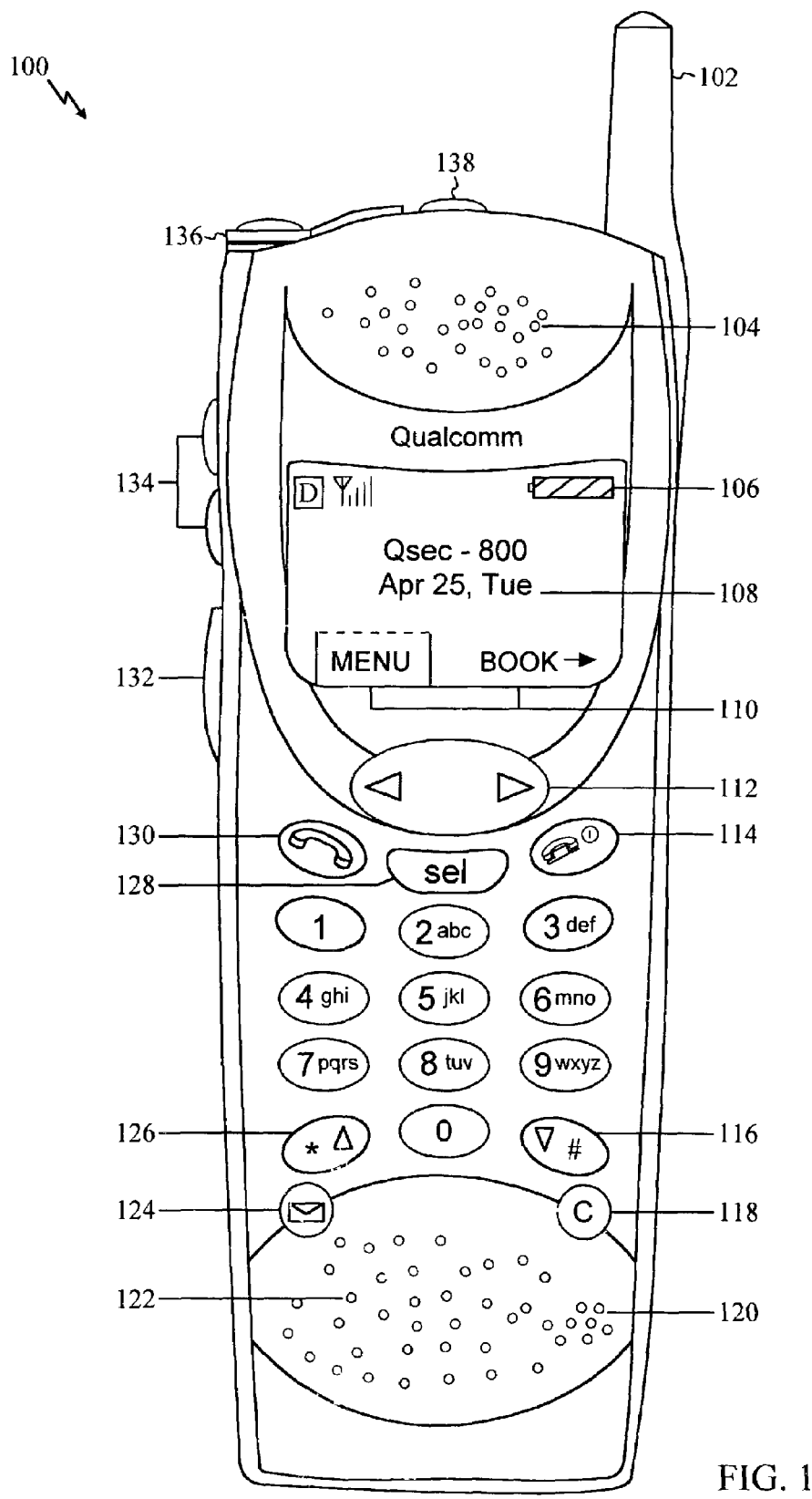

FIG. 1 illustrates a typical wireless handset 100, they may optionally be provisioned with a push-to-talk button 132 and a surveillance port 136. The phone may be equipped with components such as antenna 102, earpiece 104, display icons 106, display screen 108, screen keys 110, left and right scroll keys 112, power or end key 114, down scroll key 116, clear key 118, microphone 120, far field speaker 122, message key 124, up scroll key 126, select key 128, send/talk key 130, the push-to-talk key 132, volume key 134, the surveillance port 136 and the speaker/mute button 138.

The handset is configured to operate in at least two modes:

Traditional: Both clear and secure calls may be made; however, the default is preferably set for clear calls. In other words, the phone operates like a commercial phone until the user wishes to make a secure call. To place a secure call, the Send/Talk key is depressed for a predetermined amount of time.

Autosecure: In autosecure mode, both clear and secure calls may be made; however, the default is for secure calls. Thus, autosecure is the opposite of traditional. While using the phone in autosecure mode, one will generally make secure calls. Thus, to make a clear call, the user depresses the Send/Talk key for a predetermined period of time.

In an embodiment, a PIN is necessary for secure calls. The PIN is an access number that is typically distributed with the phone. If the users has not previously logged on as a secure user, the user is prompted to enter the PIN when making or receiving a secure call.

Once logged on as a secure user, the user remains logged on until the phone powers down.

There are several ways to make calls:

1. Traditional, press the Send/Talk key for clear mode, press and hold the Send/Talk key for secure mode;
2. Autosecure, press and hold the Send/Talk key for secure mode, press the Send/Talk key for clear mode; and
3. Secure-Only, can only make emergency clear calls (enter 911, *911, or #911 and press and hold the Send/Talk key) for secure mode, press the Send/Talk key for clear mode.

Figure 2:
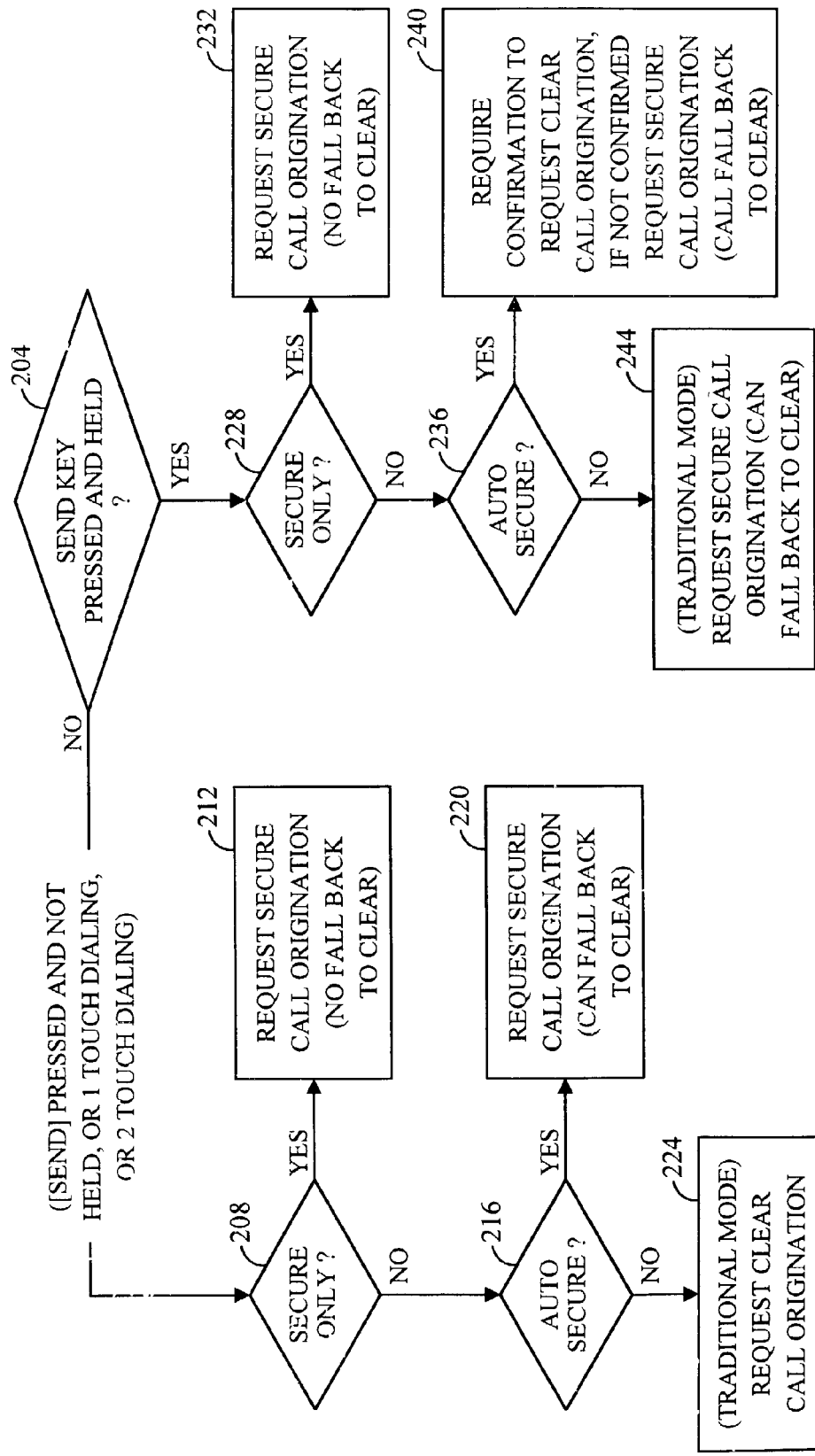

FIG. 2 is a flow chart 200 illustrating determination of a clear, secure, or auto secure call. The handset first senses 204 if the SEND key is pressed and held. If not, the next inquiry 208 is whether the handset is a secure-only handset. This inquiry may not be necessary, but rather a default position setting in a secure only handset. If the handset is a secure-only handset, a request 212 for a secure call origination is sent. If the handset operates in both clear and secure modes, the next inquiry 216 is whether the handset is in auto secure mode. If the handset is in auto secure mode, a request 220 for a secure call origination is sent. If the handset is not in auto secure mode, a clear call origination 224 is requested.

If the send key is pressed and held, the next inquiry 228 is whether the handset is a secure-only handset. Again, this inquiry may not be necessary, but rather a default position setting in a secure only handset. If the handset is a secure-only handset, a request 232 for a secure call origination is sent. If the handset operates in both clear and secure modes, the next inquiry 236 is whether the handset is in auto secure mode. If the handset is in auto secure mode, a require confirmation request 240 is sent to request clear call origination. If the request 240 is not confirmed, the call may fall back into clear mode. If the handset is not in auto secure mode, a request secure call message 244 is sent.

Whenever a call is in secure mode, the call may fall back into clear mode if needed. This may occur either because the receiving party is not a secure handset, or if the parties decide to switch to clear mode.

If one is making a clear call, the phone behaves like a commercial phone, and the call is connected. If the person being called has a secure-only phone, the screen displays a message such as "GOING SECURE/Exchanging secure dial/# . . . ." If the user has not previously logged on as a secure user, the user is prompted to enter your PIN.

Figure 3:
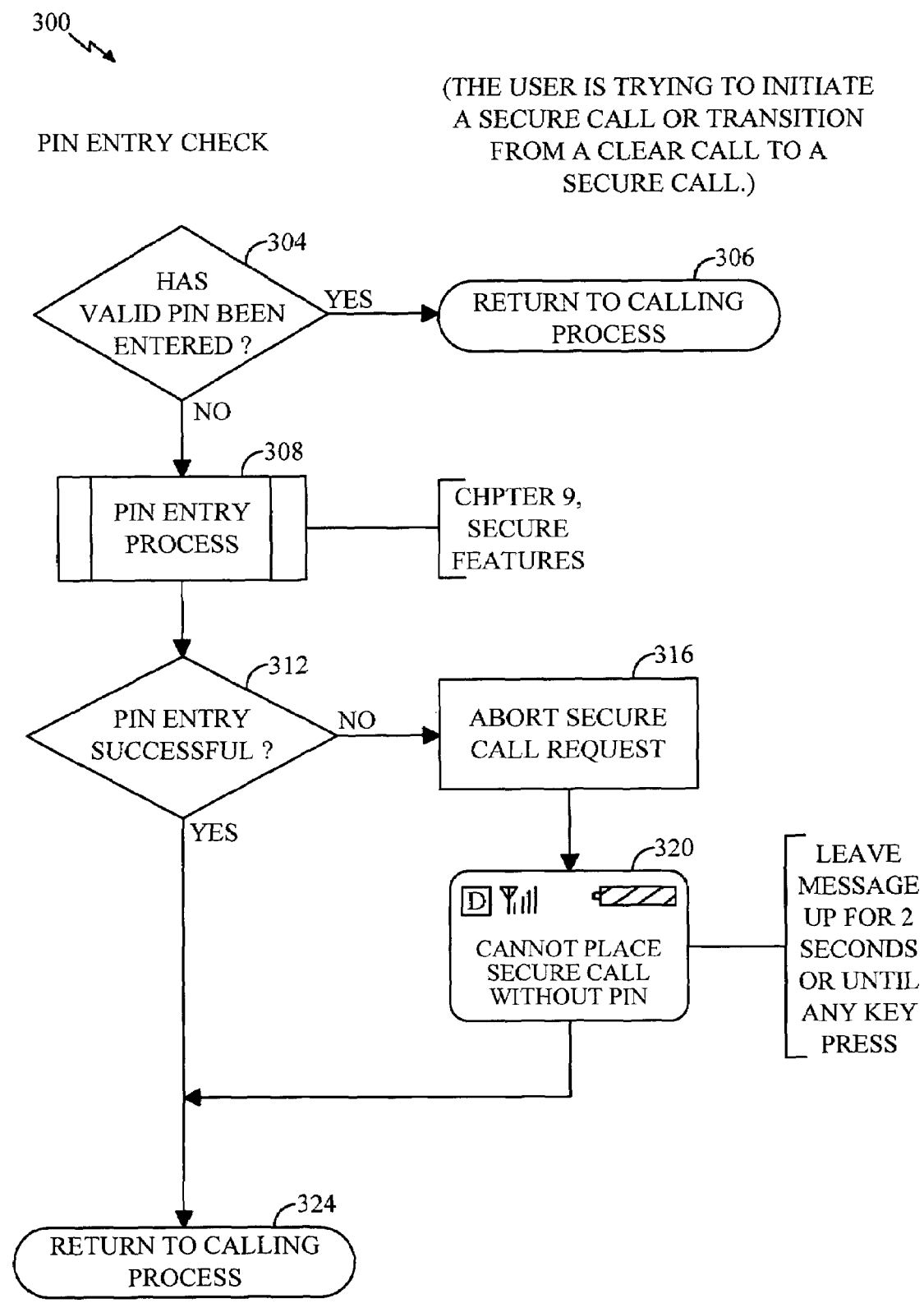

FIG. 3 illustrates a flowchart 300 for determining whether a secure user has logged in. First, a login prompt 304 is displayed, allowing the user to enter a PIN. If a valid PIN is entered, the user is returned to the calling process 306. If not, the user begins the PIN entry process 308. The next determination 312 is whether the PIN entry was successful. If not, the secure call request is aborted 316. A message 320 is presented indicating that the call cannot be placed without a valid PIN. The message may remain on the screen either for a predetermined amount of time, or until the user presses a key. If the PIN entry was successful, the user is returned to the calling process 324.

If the user is making a secure call and has not already entered your PIN, a message appears on the handset screen asking the user to enter it. After the PIN is entered, the phone displays a message such as "GOING SECURE" followed by a series of messages. If the user is not prompted to enter your PIN, it means the user is already logged on as a secure user.

In a phone capable of both clear and secure modes, one can switch the type of call connection during the call. For example, if a clear call connection is established with another party, the call may be a secure connection. The process of transitioning from a clear connection to a secure connection is illustrated in FIG. 2.

From the screen keys at the bottom of the display, select [GOSEC].
  Press and hold the Send/Talk key depending on your phone's strapping.
  Enter the PIN if prompted to do so. The person being called might also be prompted to enter a PIN. The type of messages that appear and the length of the connection time depends on whether the phone number has been previously recognized and stored as secure in the other party's phone.

Transition from secure to clear connections may be accomplished in one of the following ways:
  From the screen keys at the bottom of the display, select [GOCLR].
  Press or press and hold the Send/Talk key. A message appears on the phone display of the person called requesting confirmation to transition from secure to clear.

During a secure voice or data call, depending on the security classification, either fingerprints or DAO descriptors appear on the screen.
  Fingerprint: contains security classification (Protected=PROTEC), time, and a combination of a number of letters, numbers, or punctuation marks, which can read to the other party. The same combination may be displayed on all phones on the call. If it is not the same or the line is blank, the security of the call may be compromised. The following is a non-limiting example of a screen with a fingerprint:

DAO descriptor: contains security classification (Top Secret=TS, Secret=SEC, Confidential=CONF, and Unclassified=UNCLAS), time, and identification. The DAO descriptor is similar to caller ID and is not the same on both phones in the call.

In receiving secure calls, if one has not already entered your PIN since turning on the phone, the user is prompted to enter it. After entering the PIN, the phone displays "GOING SECURE" followed by a series of messages. The types of messages displayed and the length of the connection time depends on whether the phone number has been previously recognized and stored as secure in the calling party's phone book. When the secure call is connected, a secure call screen appears.

In originating a Point-to-Point Voice Call, typically, a user requests origination of the call. If voice calls are disabled in the UPV, the operator is alerted and call origination does not proceed. Otherwise, based on the method of call origination (long key press, short key press, one touch dialing, or two-touch dialing) and the phone's strapping (traditional, secure-only, or auto-secure), the user interface determines whether to attempt a clear or secure call. The user interface then determines the number to be dialed, in cases where both clear and secure dial numbers are available. In an embodiment, a call to an emergency number is attempted as a clear call, and go-secure transitions are not allowed.

There are at least nine ways in which a point-to-point voice call may be placed from the user interface:
  1. Manually entering the phone number and pressing [SEND] or pressing and holding [SEND].
  2. Selecting a number from the Call History List and pressing [SEND] or pressing and holding [SEND].
  3. Recalling a number from the Call History Detail Display and pressing [SEND] or pressing and holding [SEND].
  4. One Touch Dialing by pressing and holding the digit corresponding to the desired phone memory location number.
  5. Two Touch Dialing by pressing and holding the digits corresponding to the desired phone memory location number. For example, to dial memory location 25, press 2 then press and hold 5.
  6. Speed dialing by entering 1 or 2 digits and pressing [SEND] or pressing and holding [SEND].
  7. Dialing from a phone book memory list by pressing [SEND] or pressing and holding [SEND].
  8. Dialing from a phone book memory display by pressing [SEND] or pressing and holding [SEND].
  9. Pressing [SEND] to redial from standby mode (if an outgoing call has been made and the handset has not been power cycled). The last outgoing number information is now stored in NV memory when the handset is powered off (i.e., the handset can be powered off and then powered on again and the [SEND] key will still dial the last out going number).

The following logic may be used by the user interface to determine whether the user has requested clear or secure point-to-point voice call origination.
  In any mode, an emergency call is treated as a clear call origination request.
  In traditional mode, one-touch dialing, two-touch dialing, and short [SEND] key presses initiate clear voice calls. Extended [SEND] key presses initiate secure voice calls.
  In secure-only mode, requests for call initiation result in secure calls, with no fall back to clear.
  In auto-secure mode, one-touch dialing, two-touch dialing, and short [SEND] key presses initiate secure voice calls. Extended [SEND] key presses initiate clear voice calls, after user confirmation.
  In traditional and auto-secure mode, secure call initiation may revert back to a clear call if the secure call cannot be established.

If the "last outgoing number" is being dialed, the above rules still apply, regardless of whether the last outgoing number was clear or secure. The length of the key press, together with the mode of the phone, determine whether a clear or secure call has been requested.

Figure 4:
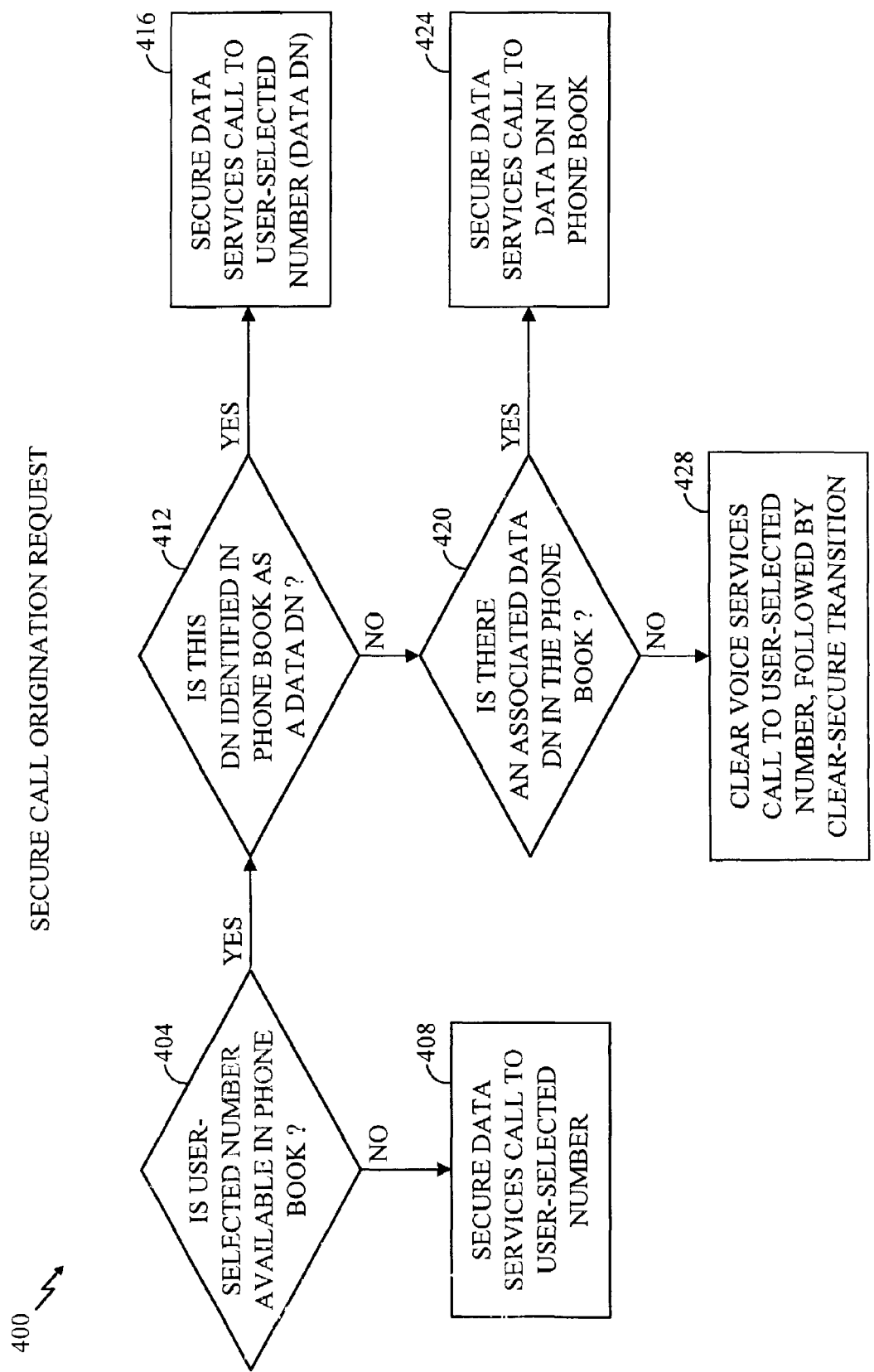

FIG. 4 illustrates a flowchart 400 of placing a secure call. The first inquiry 404 is whether the user selected number is available in the phone book. If not, a secure, or data, call is initiated 408 to the user selected number. If the number is available in the phone book, the next inquiry 412 is whether the number is registered in the phone book as a secure number. If so, a secure call 416 is initiated to the user selected number. If not, a next inquiry 420 is made as to whether a secure number is listed in the phone book in association with the user selected number. If so, the secure number in association with the user selected number is used to initiate a call 424. If not, a clear voice call to the user selected number is initiated. This may be followed by a clear to secure transition 428, if needed.

Figure 5:
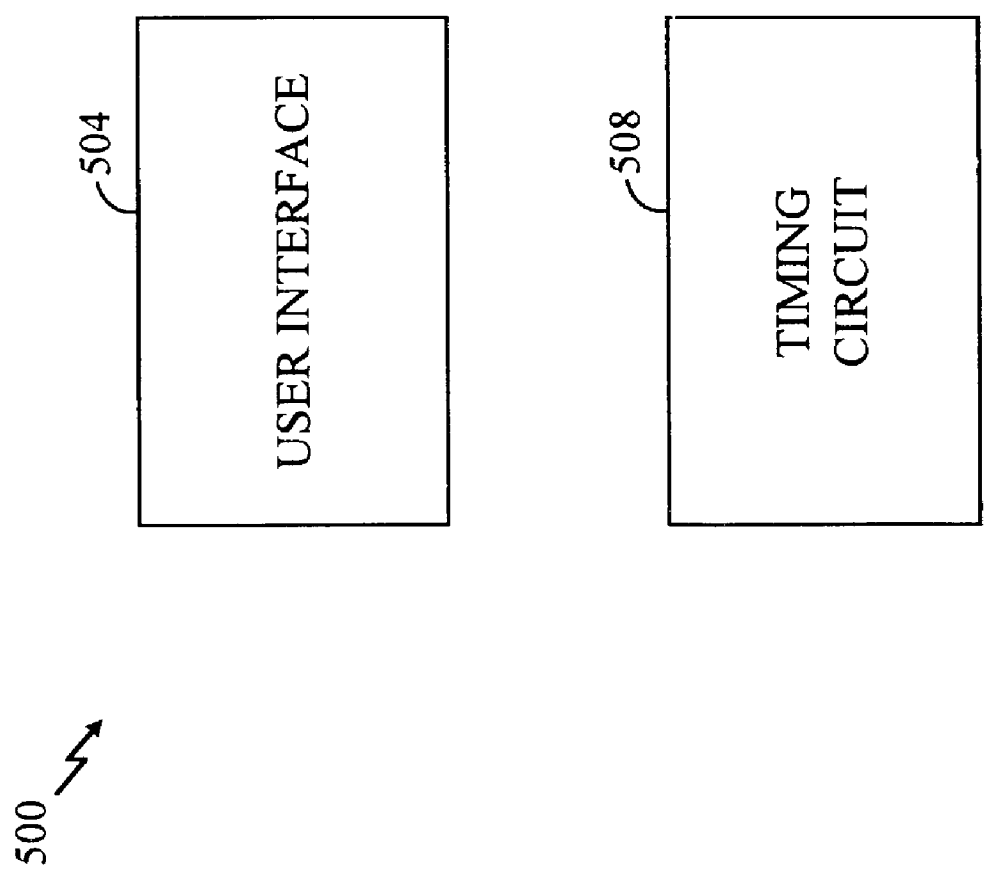

FIG. 5 illustrates an apparatus 500 for making clear and secure calls. A user interface 504, such as a SEND button, is operable when depressed by the user. A circuit 508 determines the length of time the user depresses interface 504. If the user-interface 504 is activated for more than a predetermined amount of time, the apparatus is configured to operate in secure mode. If the user-interface 504 is activated for less than a predetermined amount of time, the apparatus is configured to operate in clear mode. In an embodiment, the predetermined amount of time is between 0.01 and 5 seconds. In another embodiment, the predetermined amount of time is between 1 and 3 seconds. In another embodiment, the predetermined amount of time is 2 seconds.

If the request for point-to-point voice call origination is for a secure call, a check may be made to determine whether the secure user has logged in. If the secure user has not logged in, the login prompt is presented. Successful login results in a continuation of the call origination process. Unsuccessful login (whether aborted by the user or by too many failed logins) may result in a return to an Idle Standby Mode.

The following logic may be used to determine what number should be dialed for a point-to-point voice call origination request:

When a clear call has been requested:
 If the number cannot be found in the phone book, initiate a clear voice services call to the user-selected number.
 If the number can be determined, from the phone book, to be a voice (clear) number, then initiate a clear voice services call to the user-selected number.
 If the number can be determined, from the phone book, to be a data (secure) number, and there is an associated voice number, then initiate a clear voice services call to the associated voice number.
 If the number can be determined, from the phone book, to be a data (secure) number, and there is no associated voice number, then initiate a clear voice services call to the user-selected number (even though it is a data number).

When a secure call has been requested:
 If the number cannot be found in the phone book, initiate secure data services call to the user-selected number.
 If the number can be determined, from the phone book, to be a data (secure) number, then initiate a secure data services call to the user-selected number.
 If the number can be determined, from the phone book, to be a voice (clear) number, and there is an associated data (secure) number, then initiate a secure data services call to the associated data number.
 If the number can be determined, from the phone book, to be a voice (clear) number, and there is no associated data (secure) number, then initiate a clear voice services call to the user-selected number, followed by an immediate clear-secure transition.

If the secure call was successfully negotiated, and the security level is commercial security (i.e., 'Protected'), the fingerprint is calculated and displayed during the call.

The fingerprint may be any number of bits. In an embodiment, the fingerprint is 48 bits, obtained from the DSP. These bits are broken down into 8 6-bit chunks. Each chunk's bits correspond to a decimal value, which corresponds to a character using the following mapping:

0-25 map to A-Z
26-51 map to a-z
52-61 map to O-9
62 maps to +
63 maps to /

Both ends of the phone call should have calculated the same 48 bits, and should have the same 8 characters on their display. One user can read out his display to the other user, and they can compare to verify that there is no "man in the middle" attack.

When a clear point-to-point non-emergency call is active, the user can request a transition to a secure voice call or to a secure data call by using the appropriate soft key or by a long press of the [SEND] key. If the user has not yet logged in as the secure user, he is prompted to login before the transition request is sent (see PIN Entry Check). When the other end receives the go-secure request, the user there is prompted to log in if he has not already done so.

If the user attempts a clear to secure transition when in an emergency call, the following display may result.

When a secure point-to-point call is active, the user may request transition to a clear point-to-point call by using a soft key or by a long press of the [SEND] key. FNBDT signals the go-clear request to the other end, and the user there is prompted to confirm the go-clear transition.

If the user who is strapped for secure-only attempts a go-clear transition, the following text may be displayed for a predetermined period of time. In an embodiment, the text is displayed for about 4 seconds (or until a key press). An audible beep will sound (unless restricted), and the secure call will continue.

Secure Dial is permitted when a secure voice call has been established. The user enters digits, *, and # and then presses the [SEND] key to send the digits as a secure dial stream. The user may also activate a soft key for access to additional secure dial characters (Autovon FLASH-OV, FLASH, IN4MEDIATE, and PRIORITY, as well as Go On Hook and Hookflash). The secure dial display is a multi-page display.

The secure application mode change allows the user to change from secure voice to secure data. (When in the data mode, the user has an option to change from secure data to secure voice.) The mode change is typically valid after secure voice has been established. The mode change is requested by accessing the [DATA] soft key option from In Use Standby.

A clear data call is typically originated via a command from the communication software of a connected computing device. A clear data call cannot be directly connected from the handset keypad. A secure data call is originated by selecting the Secure Data option from the Features menu and then dialing the number from the keypad. The user is alerted if the UPV prohibits the requested data call. Unless disabled, the backlight is illuminated at initiation of a data call.

Additional notes for outgoing data calls:
 Typically, no additions to the call history list will occur for outgoing clear data calls. The call history will be updated for outgoing secure data calls.
  If the last outgoing call on the handset was a clear data call (which is dialed from AT commands through the data port), then the last number redial feature (user pressing [SEND] key) will dial the last number that was dialed through the keypad.
  If no redial number is available, the following display will be shown, and the standard key beep tone will be played as applicable.

The CST typically cannot receive clear data calls. The following activity occurs upon receipt of a data call:

Since the CST does not support unattended mode, data calls must be answered from the keypad. The determination of whether the call is for data or voice is not made until FNBDT negotiation.

Data calls cannot be answered from the external computing device's communication software commands. A data call will be answered when the user presses [SEND], even if the keypad is locked and the keypad will remain locked through the duration of the call and at the end of the call.

The ringer may be silenced in the standard manner.

Typically, the phone cannot distinguish incoming secure data calls from incoming secure voice calls, since the determination of voice or data application is not made until FNBDT negotiation. Incoming secure data call behavior is therefore the same as for incoming secure voice call (the CST does not support incoming clear data calls).

The Key Management functionality requires that the user be offline. If the user is in a call when this option is selected, the "Feature not available during a phone call" display is shown.

While in the key management functions, the user is not allowed to go online (by initiating or receiving a call). While keys are being loaded, the Security Subsystem may, in addition, suspend communication with the base station by taking the modem offline.

Key management supported by the user interface allows the secure user (when the secure user PIN has been entered) to selectively delete key material, to delete all key material, and (if authorized through the UPV) to load key material.

The user will be prompted to logon (if not already logged on) when the "Load Keys" menu item is selected. The user's ability to load keys is enabled through the UPV. The implementation of this function is otherwise identical to the TA's ability to load keys.

The user will be prompted to logon (if not already logged on) when the "View Keys" menu item is selected. The user's ability to view and delete keys is otherwise identical to the TA's ability to view and delete keys.

The user will be prompted to logon (if not already logged on) when the "Delete All Keys'menu item is selected. The user's ability to delete all keys is otherwise identical to the TA's ability to delete all keys.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers in the FIFO, a processor executing a set of firmware instructions, any conventional programmable software and a processor, a field programmable gate array (FPGA) or other programmable logic device, or any combination thereof. The processor may advantageously be a micro-controller, but in the alternative, the processor may be any conventional processor, controller, micro-controller, or state machine. The software may reside in RAM memory, flash memory, ROM memory, EPROM memory, EEPROM memory, hard disk, removable disks, a CD-ROM, a DVD-ROM, registers, or any other magnetic or optical storage media.

The previous description of the preferred embodiments is provided to enable any persons skilled in the art to make or use the present invention. Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What we claim as our invention is:

1. In a system of operating a wireless handset capable of clear calls and secure calls, a method comprising:
    entering a personal identification number (PIN) each time the wireless handset is activated to register as a secure user to allow a secure call;
    pressing a send/talk key for a predetermined amount of time;
    determining whether the handset is in a traditional mode, in an autosecure mode, or in a secure-only mode;
    if the handset is currently in the traditional mode, originating a secure call if the send/talk key is held for a time period greater than the predetermined amount of time, and originating a clear call if the send/talk key is held for a time period less than the predetermined amount of time;
    if the handset is currently in the autosecure mode, originating a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and
    if the handset is currently in the secure mode, originating a secure call.

2. The method as set forth in claim 1, wherein the predetermined amount of time is two seconds.

3. The method as set forth in claim 1, further comprising disabling the handset if the PIN number is incorrectly entered more than a predetermined number of times.

4. The method as set forth in claim 3, wherein the predetermined number of times is 7.

5. The method as set forth in claim 3, wherein the predetermined number of times is 3.

6. A wireless apparatus configurable to make clear calls and secure calls, the apparatus comprising:
    a user-interface having keys for entering a personal identification number (PIN) each time the wires handset is activated to register as a secure user to allow a secure call, and having a send/talk key capable of being depressed; and
    a circuit configured to measure the amount of time the send/talk key is depressed, wherein the apparatus is configured to determine whether the wireless apparatus is in a traditional mode, in an autosecure mode, or in a secure-only mode, wherein:
    if the handset is in the traditional mode, the wireless apparatus is configured to originate a secure call if the send/talk key is depressed for greater than a predetermined amount of time, and to originate a clear call if the user-interface key is held for a time period less than the predetermined amount of time, if the handset is in the autosecure mode, the apparatus is configured to originate a secure call if the send/talk key is depressed for less than a predetermined amount of time, send a confirmation request to originate a clear call if the send/talk key is depressed for greater than a predetermined amount of time, and originate a clear call if the confirmation request is confirmed; and if the handset is in the secure only mode, originating a secure call.

7. The wireless apparatus as set forth in claim 6, wherein the predetermined amount of time is two seconds.

8. A wireless handset capable of clear calls and secure calls, comprising:

means for entering a personal identification number (PIN) each time the wireless handset is activated to register as a secure user to allow a secure call;

means for pressing a send/talk key for a predetermined amount of time;

means for determining whether the handset is in a traditional mode, in an autosecure mode, or in a secure-only mode;

means for originating, if the handset is currently in the traditional mode, a secure call if the send/talk key is held for a time period greater than the predetermined amount of time and a clear call if the send/talk key is held for a time period less than the predetermined amount of time, means for originating, if the handset is currently in the autosecure mode, a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and mean for originating a secure call if the handset is currently in the secure mode.

9. The wireless handset as set forth in claim 8, wherein the predetermined amount of time is two seconds.

10. The wireless handset as set forth in claim 8, further comprising means for disabling the handset if the PIN number is incorrectly entered more than a predetermined number of times.

11. A computer program product, comprising:

computer-readable medium having a stored computer program, comprising:

instructions for causing a computer to receive a personal identification number (PIN) each time the wireless handset is activated to register as a secure user to allow a secure call;

instructions for causing a computer to determine if a send/talk key of a handset has been pressed for a predetermined amount of time, wherein the handset is capable of clear calls and secure calls;

instructions for causing a computer to determine whether the handset is in a traditional mode, in an autosecure mode, or in a secure-only mode;

instructions for causing a computer to originate, if the handset is currently in the traditional mode, a secure call if the send/talk key is held for a time period greater than the predetermined amount of time and a clear call if the send/talk key is held for a time period less than the predetermined amount of time, instructions for causing a computer to originate, if the handset is currently in the autosecure mode, a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and instructions for causing a computer to originate a secure call if the handset is currently in the secure mode.

12. The computer program product as set forth in claim 11, wherein the predetermined amount of time is two seconds.

13. In a system of operating a wireless handset capable of clear calls and secure calls, a method comprising:

entering a personal identification number (PIN) to register as a secure user to allow a secure call;

disabling the handset if the PIN number is incorrectly entered more than a predetermined number of times;

pressing a send/talk key for a predetermined amount of time;

determining whether the handset is in a traditional mode, in an autosecure mode, or in a secure-only mode;

if the handset is currently in the traditional mode, originating a secure call if the send/talk key is held for a time period greater than the predetermined amount of time, and originating a clear call if the send/talk key is held for a time period less than the predetermined amount of time;

if the handset is currently in the autosecure mode, originating a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and if the handset is currently in the secure mode, originating a secure call.

14. The method as set forth in claim 13, wherein the predetermined amount of time is two seconds.

15. The method as set forth in claim 13, wherein the predetermined number of times is 7.

16. The method as set forth in claim 13, wherein the predetermined number of times is 3.

17. A wireless apparatus configurable to make clear calls and secure calls, the apparatus comprising:

a user-interface having:

keys for entering a personal identification number (PIN) to register as a secure user to allow a secure call, wherein the handset is disabled if the PIN number is incorrectly entered more than a predetermined number of times, and a send/talk key capable of being depressed; and a circuit configured to measure the amount of time the send/talk key is depressed, wherein the apparatus is configured to determine whether the wireless apparatus is in a traditional mode, in an autosecure mode, or in a secure-only mode, wherein:

if the handset is in the traditional mode, the wireless apparatus is configured to originate a secure call if the send/talk key is depressed for greater than a predetermined amount of time, and to originate a clear call if the user-interface key is held for a time period less than the predetermined amount of time, if the handset is in the autosecure mode, the apparatus is configured to originate a secure call if the send/talk key is depressed for less than a predetermined amount of time, send a confirmation request to originate a clear call if the send/talk key is depressed for greater than a predetermined amount of time, and originate a clear call if the confirmation request is confirmed; and if the handset is in the secure only mode, originating a secure call.

18. The wireless apparatus as set forth in claim 17, wherein the predetermined amount of time is two seconds.

19. The wireless apparatus as set forth in claim 17, wherein the predetermined number of times is 7.

20. The wireless apparatus as set forth in claim 17, wherein the predetermined number of times is 3.

21. A wireless handset capable of clear calls and secure calls, comprising:
- means for entering a personal identification number (PIN) to register as a secure user to allow a secure call;
- means for disabling the handset if the PIN number is incorrectly entered more than a predetermined number of times;
- means for pressing a send/talk key for a predetermined amount of time;
- means for determining whether the handset is in a traditional mode, in an autosecure mode, or in a secure-only mode;
- means for originating, if the handset is currently in the traditional mode, a secure call if the send/talk key is held for a time period greater than the predetermined amount of time and a clear call if the send/talk key is held for a time period less than the predetermined amount of time,
- means for originating, if the handset is currently in the autosecure mode, a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and
- mean for originating a secure call if the handset is currently in the secure mode.

22. The wireless handset as set forth in claim 21, wherein the predetermined amount of time is two seconds.

23. The wireless handset as set forth in claim 21, wherein the predetermined number of times is 7.

24. The wireless handset as set forth in claim 21, wherein the predetermined number of times is 3.

25. A computer program product, comprising:
computer-readable medium having a stored computer program, comprising:
- instructions for causing a computer to receive a personal identification number (PIN) each time the wireless handset is activated to register as a secure user to allow a secure call;
- instructions for causing a computer to disable the handset if the PIN number is incorrectly entered more than a predetermined number of times;
- instructions for causing a computer to determine if a send/talk key of a handset has been pressed for a predetermined amount of time, wherein the handset is capable of clear calls and secure calls;
- instructions for causing a computer to determine whether the handset is in a traditional mode, in an autosecure mode, or in a secure-only mode;
- instructions for causing a computer to originate, if the handset is currently in the traditional mode, a secure call if the send/talk key is held for a time period greater than the predetermined amount of time and a clear call if the send/talk key is held for a time period less than the predetermined amount of time,
- instructions for causing a computer to originate, if the handset is currently in the autosecure mode, a secure call if the send/talk key is held for a time period less than the predetermined amount of time, sending a confirmation request to originate a clear call if the send/talk key is held for a time period greater than the predetermined amount of time, and originating a clear call if the confirmation request is confirmed; and
- instructions for causing a computer to originate a secure call if the handset is currently in the secure mode.

26. The computer program product as set forth in claim 25, wherein the predetermined amount of time is two seconds.

27. The computer program product as set forth in claim 25, wherein the predetermined number of times is 7.

28. The computer program product as set forth in claim 25, wherein the predetermined number of times is 3.

* * * * *

UNITED STATES PATENT AND TRADEMARK OFFICE
CERTIFICATE OF CORRECTION

PATENT NO.       : 7,603,104 B2                                      Page 1 of 1
APPLICATION NO.  : 10/015996
DATED            : October 13, 2009
INVENTOR(S)      : Carter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 220 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,603,104 B2 | Page 1 of 1 |
| APPLICATION NO. | : 10/015996 | |
| DATED | : October 13, 2009 | |
| INVENTOR(S) | : Carter et al. | |

It is certified that error appears in the above-identified patent and that said Letters Patent is hereby corrected as shown below:

Title page, line 4, Inventor address: "San Diego," to read as --Rancho Santa Fe,--

Column 8, line 55, claim 6: "wires handset" to read as --apparatus--

Column 8, line 64, claim 6: "handset" to read as --apparatus--

Column 9, line 3, claim 6: "handset" to read as --apparatus--

Column 9, line 10, claim 6: "handset" to read as --apparatus--

Column 9, line 10, claim 6: "secure only" to read as --secure-only--

Column 9, line 23, claim 8: "time," to read as --time;--

Column 9, line 63, claim 11: "time," to read as --time;--

Column 10, line 60, claim 17: "time," to read as --time;--

Column 11, line 1, claim 17: "secure only" to read as --secure-only--

Column 11, line 25, claim 21: "time," to read as --time;--

Column 12, line 23, claim 25: "time," to read as --time;--

Signed and Sealed this
Twelfth Day of July, 2011

David J. Kappos
*Director of the United States Patent and Trademark Office*